United States Patent
Wright et al.

(10) Patent No.: US 10,814,972 B2
(45) Date of Patent: Oct. 27, 2020

(54) AIR VEHICLE AND METHOD AND APPARATUS FOR CONTROL THEREOF

(71) Applicant: BAE Systems plc, London (GB)

(72) Inventors: Julian David Wright, Preston Lancashire (GB); Nicholas Giacomo Robert Colosimo, Preston Lancashire (GB); Clyde Warsop, Bristol (GB)

(73) Assignee: BAE Systems plc, London (GB)

( * ) Notice: Subject to any disclaimer, the term of this patent is extended or adjusted under 35 U.S.C. 154(b) by 245 days.

(21) Appl. No.: 15/767,041

(22) PCT Filed: Oct. 28, 2016

(86) PCT No.: PCT/GB2016/053347
§ 371 (c)(1),
(2) Date: Apr. 9, 2018

(87) PCT Pub. No.: WO2017/072519
PCT Pub. Date: May 4, 2017

(65) Prior Publication Data
US 2019/0061935 A1 Feb. 28, 2019

(30) Foreign Application Priority Data

Oct. 30, 2015 (EP) ..................................... 15275224
Oct. 30, 2015 (GB) .................................. 1519180.2

(51) Int. Cl.
*B64C 29/02* (2006.01)
*B64C 3/38* (2006.01)
(Continued)

(52) U.S. Cl.
CPC ............ *B64C 29/0033* (2013.01); *B64C 3/38* (2013.01); *B64C 29/02* (2013.01); *B64C 39/024* (2013.01);
(Continued)

(58) Field of Classification Search
CPC ..... B64C 29/0033; B64C 29/02; B64C 39/10; B64C 3/38; B64C 2201/028; B64C 2201/088; B64C 2201/102
See application file for complete search history.

(56) References Cited

U.S. PATENT DOCUMENTS 1,790,309 A   1/1931  Keintz
2,349,858 A   5/1944  Gillmor
(Continued)

FOREIGN PATENT DOCUMENTS

CN   104787315 A   7/2015
CN   204822073 U  12/2015
(Continued)

OTHER PUBLICATIONS

International Search Report and Written Opinion of International Application No. PCT/GB2016/053347. dated Jan. 18, 2017, 13 pages.
(Continued)

*Primary Examiner* — Philip J Bonzell
*Assistant Examiner* — Tye William Abell
(74) *Attorney, Agent, or Firm* — Maine Cernota & Rardin (57) ABSTRACT

An air vehicle comprising a main body and a pair of opposing wing members extending substantially laterally from the main body, at least a first propulsion device associated with a first of said wing members and a second propulsion device associated with a second of said wing members, each said propulsion device being arranged and configured to generate linear thrust relative to said main body, in use, the air vehicle further comprising a control module for generating a control signal configured to change a mode of flying of said air vehicle, in use, between a fixed wing mode and a rotary wing mode, wherein, in said fixed wing mode of flying, the direction of thrust generated by the
(Continued)

first propulsion device relative to the main body is the same as the direction of thrust generated by the second propulsion device, and in said second mode of flying, the direction of thrust generated by the first propulsion device relative to the main body is opposite to that generated by the second propulsion device.

18 Claims, 7 Drawing Sheets

(51) Int. Cl.
  B64C 39/10 (2006.01)
  B64C 29/00 (2006.01)
  B64C 39/02 (2006.01)
(52) U.S. Cl.
  CPC ........ *B64C 39/10* (2013.01); *B64C 2201/028* (2013.01); *B64C 2201/088* (2013.01); *B64C 2201/102* (2013.01); *B64C 2201/18* (2013.01)

(56) References Cited

U.S. PATENT DOCUMENTS

| | | | | |
|---|---|---|---|---|
| 2,479,125 | A | * | 8/1949 | Leonard .............. B64C 29/0075 244/7 B |
| 3,136,501 | A | | 6/1964 | Barber |
| 4,123,020 | A | | 10/1978 | Korsak |
| 4,522,104 | A | | 6/1985 | Degen |
| 5,267,885 | A | | 12/1993 | Niskern |
| 5,279,199 | A | | 1/1994 | August |
| 5,765,783 | A | * | 6/1998 | Albion .................... B64C 29/02 244/17.23 |
| 6,260,796 | B1 | | 7/2001 | Klingensmith |
| 6,477,326 | B1 | | 11/2002 | Partynski |
| 8,544,788 | B1 | * | 10/2013 | Capper .................... B64B 1/28 244/33 |
| 9,085,354 | B1 | * | 7/2015 | Peeters .................. B64C 17/00 |
| 2003/0179288 | A1 | | 9/2003 | Jones |
| 2003/0185549 | A1 | | 10/2003 | Partynski |
| 2008/0105112 | A1 | | 5/2008 | Grabmeier |
| 2008/0223994 | A1 | * | 9/2008 | Greenley ............... A63H 27/02 244/7 R |
| 2010/0025543 | A1 | * | 2/2010 | Kinsey .................... B64C 29/02 244/7 A |
| 2010/0228406 | A1 | | 9/2010 | Hamke |
| 2010/0252690 | A1 | * | 10/2010 | Hothi .................... B64C 39/024 244/7 B |
| 2012/0248259 | A1 | * | 10/2012 | Page ....................... B64C 29/02 244/7 A |
| 2013/0162761 | A1 | | 6/2013 | Goldemann |
| 2013/0250047 | A1 | | 9/2013 | Hollinger |
| 2014/0008498 | A1 | * | 1/2014 | Reiter .................... B64C 29/00 244/7 A |
| 2014/0340427 | A1 | | 11/2014 | Baker |
| 2018/0370624 | A1 | * | 12/2018 | Seale ..................... B64C 27/16 |

FOREIGN PATENT DOCUMENTS

| | | |
|---|---|---|
| DE | 1269497 B | 5/1968 |
| DE | 102006021182 A1 | 11/2007 |
| DE | 102007054126 A1 | 5/2009 |
| EP | 1873058 A2 | 1/2008 |
| FR | 757191 A | 12/1933 |
| FR | 2246444 A1 | 5/1975 |
| FR | 2379430 A2 | 9/1978 |
| FR | 2796454 A1 | 1/2001 |
| GB | 272455 A | 12/1927 |
| GB | 2514582 A | 12/2014 |
| JP | H03292294 A | 12/1991 |
| JP | 2012111475 A | 6/2012 |
| RU | 2072942 C1 | 2/1997 |
| RU | 2330790 C2 | 8/2008 |
| WO | 03063513 A1 | 7/2003 |
| WO | 2008112686 A1 | 9/2008 |
| WO | 2009059173 A1 | 5/2009 |
| WO | 2012029063 A1 | 3/2012 |
| WO | 2012035153 A1 | 3/2012 |
| WO | 2013109742 A1 | 7/2013 |
| WO | 2013120912 A1 | 8/2013 |
| WO | 2014118299 A1 | 8/2014 |
| WO | 2014177591 A1 | 11/2014 |
| WO | 2016109408 A | 7/2016 |
| WO | 2017007915 A1 | 1/2017 |

OTHER PUBLICATIONS

Search Report under Section 17(5) of Great Britain Application No. GB1519180.2, dated Apr. 27, 2016, 3 pages.
Combined Search and Examination Report under Sections 17 and 18(3) of Great Britain Application No. GB1618228.9, dated Mar. 29, 2017, 7 pages.
Extended European Search Report of European Application No. EP15275224, dated Mar. 24, 2016, 8 pages.
International Search Report and Written Opinion of International Application No. PCT/GB2016/053348, dated Jan. 19, 2017, 18 pages.
Search Report under Section 17(5) of Great Britain Application No. GB1519178.6, dated Apr. 25, 2016, 3 pages.
Combined Search and Examination Report under Sections 17 and 18(3) of Great Britain Application No. GB1618236.2, dated Mar. 30, 2017, 6 pages.
Extended European Search Report of European Application No. EP15275223.4, dated Jun. 6, 2016, 12 pages.
International Search Report and Written Opinion of International Application No. PCT/GB202016053345, dated Jan. 11, 2017, 12 pages.
Search Report under Section 17(5) of Great Britain Application No. GB1519177.8, dated Apr. 25, 2016, 4 pages.
Extended European Search Report of European Application No. EP15275222.6, dated Apr. 25, 2016, 8 pages.
International Search Report and Written Opinion of International Application No. PCT/GB2016/053346, dated Jan. 9, 2017, 15 pages.
Search Report under Section 17(5) of Great Britain Application No. GB1519183.6, dated Apr. 29, 2016, 3 pages.
Combined Search and Examination Report under Sections 17 and 18(3) of Great Britain Application No. GB1618221.4, dated Mar. 23, 2017, 5 pages.
[Squadrone Systems] Hexo+ aerial drone system Kickstarter page, explaining key features, stored bu internet archive on Jul. 26, 2014. Found at http://web.archive.org/web/20140726061306/https://www.kickstarter.com/projects/sqdr/hexo-your-autonomous-aerial-camera Accessed Mar. 3, 2017.
Extended European Search Report of European Application No. EP15275226.7, dated Jul. 4, 2016, 12 pages.
International Search Report and Written Opinion of International Application No. PCT/GB2016/053353, dated Dec. 15, 2016, 11 pages.
Search Report under Section 17(5) of Great Britain Application No. GB1519181.0, dated Apr. 28, 2016, 3 pages.
Extended European Search Report of European Application No. EP15275225.9, dated May 13, 2016, 8 pages.
International Preliminary Report on Patentability of International Application No. PCTGB2016053346, dated May 11, 2018, 11 pages.
International Preliminary Report on Patentability of International Application No. PCTGB2016053347, dated May 11, 2018, 9 pages.
International Preliminary Report on Patentability of International Application No. PCTGB2016053348, dated May 11, 2018, 11 pages.
International Preliminary Report on Patentability of International Application No. PCTGB2016053345, dated May 11, 2018, 8 pages.
International Preliminary Report on Patentability of International Application No. PCTGB2016053353, dated May 11, 2018, 8 pages.
Notice of Allowance for U.S. Appl. No. 15/768,729, dated Jun. 25, 2020, 16 Pages.

(56) References Cited

OTHER PUBLICATIONS

Notice of Allowance for U.S. Appl. No. 15/768,716, dated Aug. 3, 2020, 18 Pages.

* cited by examiner

Spigot with gearing capable of being rotated by an actuator (e.g. an electric motor)

Wing rotation about this axis

Fig. 5

Geared Actuator (e.g. electric motor) -housed within main aircraft body

Rotation

Wing Optimised for Forward Fixed Wing Flight (i)

Wing Angle of Attack changed after rotation about the spigot for Vertical / Rotary Wing Flight so as to generate lift in the correct (upward) direction (ii)

Whilst inefficient this approach is only needed for take off / landing (and perhaps hover) phases of flight thus representing a minor overall compromise

AIR VEHICLE AND METHOD AND APPARATUS FOR CONTROL THEREOF

RELATED APPLICATIONS

This application is a national phase application filed under 35 USC § 371 of PCT Application No. PCT/GB2016/053347 with an International filing date of Oct. 28, 2016 which claims priority of GB Patent Application 1519180.2 filed Oct. 30, 2015 and EP Patent Application 15275224.2 filed Oct. 30, 2015. Each of these applications is herein incorporated by reference in its entirety for all purposes.

This invention relates generally to an air vehicle, and, more particularly but not necessarily exclusively, to an unmanned aerial vehicle (UAV) and method and apparatus for control thereof.

Unmanned aerial vehicles (UAVs), or drones, are well known and used in many different military, as well as civil and commercial, applications, such as search and rescue, surveillance, reconnaissance, etc. In general, a UAV is a powered aerial vehicle that does not require a human operator, uses aerodynamic forces to provide vehicle lift, and can fly autonomously or be piloted remotely. Although not always a requirement, it is often required for such vehicles to be recoverable and even reusable after a mission.

As with piloted air vehicles, two principal, general types of UAV are known: (i) fixed wing, and (ii) rotary wing.

Figure 1A:
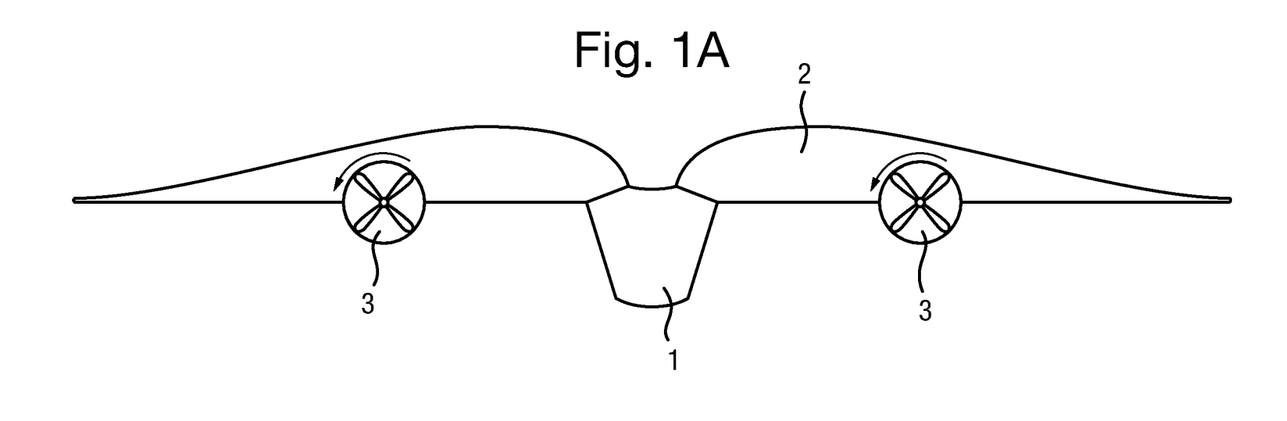
FIG. 1A is a schematic front view of a fixed wing air vehicle according to the prior art.

A fixed wing air vehicle is illustrated schematically in FIG. 1A of the drawings. As shown, a fixed wing air vehicle comprises a main body 1 having a pair of wings 2 extending therefrom, and a respective thrust mechanism 3, such as a propeller or jet, mounted on (or in relation to) each wing. Lift is created by the vehicle's forward airspeed and the shape of the wings 2. The principal advantage of a fixed wing UAV is the speed and endurance that can be achieved, making such UAVs particularly suitable for long-distance and/or persistent missions.

Figure 1B:
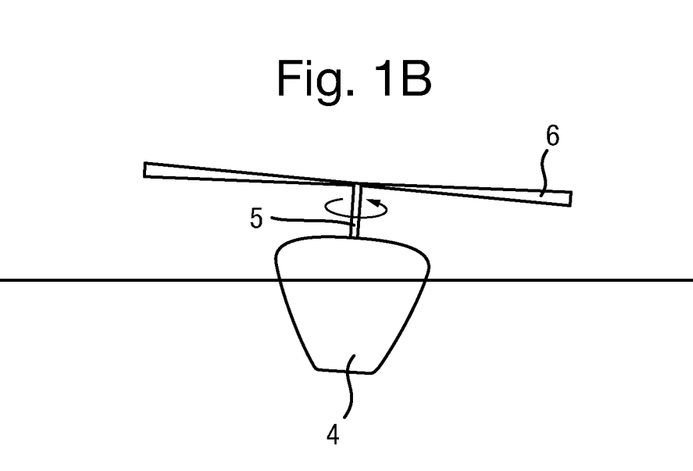
FIG. 1B is a schematic front view of a rotary wing air vehicle according to the prior art.

A rotary wing air vehicle is illustrated schematically in FIG. 1B of the drawings. As shown, a rotary wing UAV typically comprises a main body 4 having a generally central mast 5 mounted at its upper end, with rotor blades 6 rotatably mounted on the mast 5. Lift is generated by high speed rotation of the rotor blades 6 around the mast 5. The principal advantage of a rotary wing UAV is that it can take off and land vertically as well as fly forwards, backwards and laterally, and hover, making it particularly suitable for take off and landing where ground space is limited, as well as specific surveillance operations where control is paramount. However, compared with fixed wing air vehicles, rotary winged aircraft have a relatively limited 'endurance'.

There are, nevertheless, many circumstances in which the speed and endurance capability of a fixed wing UAV, as well as the maneuverability of a rotary wing UAV, may be required, whereas there is currently a clear trade-off between the two distinct types of UAV. It would, therefore, be desirable to provide an air vehicle, such as a UAV, that is able to take off and land from a relatively small ground space, fly forward, backward and laterally, as required, and hover, as well as having the speed and endurance characteristics of a fixed wing air vehicle.

Prior art arrangements exist in which the flight mode of an air vehicle can be changed, mid-flight, from a fixed wing flight mode to a rotary wing flight mode, and vice versa, by providing the wings on a rotary collar configured to rotate about the longitudinal axis of the fuselage. In use, in the fixed wing mode, the principal plane of the wings is substantially parallel to the longitudinal axis of the fuselage and the direction of thrust of the engines or propellers on both wings is the same, to create forward movement of the vehicle parallel to the above-mentioned longitudinal axis. In the rotary wing mode, the wings are re-oriented, such that their principal plane is generally orthogonal to the longitudinal axis of the fuselage, and the direction of thrust of the engine/propeller one each wing is in opposition so as to create a rotational force about the longitudinal axis of the fuselage and causing the wings to rotate the rotary collar around the fuselage to create vertical movement of the vehicle. However, the required change of orientation of the fuselage mid-flight can cause safety issues and is aerodynamically inefficient. Furthermore, the rotary collar and actuation mechanisms are necessarily complex and add to the overall weight of the vehicle.

Aspects of the present invention seek to address at least some of these issues and, in accordance with a first aspect of the present invention, there is provided an air vehicle comprising a main body and a pair of opposing wing members extending substantially laterally from the main body, at least a first propulsion device associated with a first of said wing members and a second propulsion device associated with a second of said wing members, each said propulsion devices being arranged and configured to generate linear thrust relative to said main body, in use, the air vehicle further comprising a control module for generating a control signal configured to change a mode of flying of said air vehicle, in use, between a fixed wing mode and a rotary wing mode, wherein, in said fixed wing mode of flying, the direction of thrust generated by the first and second propulsion devices relative to the main body is the same and in a first direction, and in said rotary wing mode of flying, the orientation of the principal plane of said wing members relative to said main body is the same as that in the fixed wing mode of flying, and the direction of thrust generated by the first propulsion device relative to the main body is in the first direction and the direction of thrust generated by said second propulsion device relative to said main body is in a second direction, substantially opposite to said first direction, so as to create a rotational force, said wing members being fixedly coupled to said main body in said rotary wing mode of flying such that said main body is caused to rotate by said rotational force.

Thus, and as a result of this arrangement, the need for the rotary collar is eliminated, and the main body remains in the same orientation for both the fixed wing and rotary wing modes of flight.

In one exemplary embodiment, the propulsion devices may be fixedly coupled to respective wing members, and at least one of said wing members may be rotatably mounted with respect to said body for rotation about an axis orthogonal to the width of the main body when in an upright orientation, between a first position defining said fixed flying mode wherein thrust generated by both said propulsion devices acts in the same direction relative to the main body, and a second position defining said rotary wing flying mode wherein thrust generated by said propulsion devices acts in opposite respective directions relative to said main body.

The at least one wing member may be configured to rotate through substantially 180° about said axis between said first and second positions. The at least one wing member may be mounted to the main body via a coupling member, said coupling member engaging with an actuation device located in or on said main body, wherein operation of said actuation member is effected by said control signal and causes rotation of said at least one wing member via said coupling member. In an exemplary embodiment, the at least one wing member may be mounted to said main body via a geared spigot, the air vehicle further comprising a geared actuator assembly with which said geared spigot engages, in use, and wherein rotation of said actuator causes corresponding rotation of said at least one wing member, via said geared spigot, between said first and second positions.

In an exemplary embodiment, the propulsion devices may comprise propellers, and said change of mode of flying may be effected by changing the direction of rotation of one of said propellers. This may be considered advantageous as it may be mush less aerodynamically disruptive than physically and mechanically moving a wing member. Indeed, in accordance with another aspect of the present invention, there is provided an air vehicle comprising a main body and a pair of opposing wing members extending substantially laterally from the main body, at least a first propeller associated with a first of said wing members and a second propeller associated with a second of said wing members, each said propeller being arranged and configured to generate linear thrust relative to said main body, in use, the air vehicle further comprising a control module for generating a control signal configured to change a mode of flying of said air vehicle, in use, between a fixed wing mode and a rotary wing mode, wherein in said fixed wing mode of flying, the direction of thrust generated by the first and second propellers relative to said main body is substantially the same, and in said rotary wing mode of flying, the direction of thrust generated by said first propeller is opposite to that generated by the second propeller, wherein said change of mode of flying is effected by changing the direction of rotation of one of said propellers.

In any event, it is envisaged that the aerofoil cross-section and/or angle of attack of the propeller blades may be dynamically altered, depending on where they are within their respective rotary cycle, in order to maintain an adequate aerofoil cross-section (relative to the direction of motion of the vehicle) for effective flight, and obviate any counter-productive effect thereof on horizontal motion of the vehicle.

The control module may be configured to receive control inputs representative of vehicle movement and generate control signals configured to cause the respective vehicle movement. Such vehicle movement may comprise an increase or decrease in altitude, and said control signals may be configured to cause a respective substantially equal increase or decrease in thrust generated by both of said propulsion devices.

The vehicle movement may comprise horizontal movement in a selected direction, said wing members comprising selectively movable flight control members, said control signals being configured to effect cyclic control of said air vehicle by selectively changing the cross-sectional shape of the respective wing members by selective movement of said flight control members.

The vehicle movement may comprise horizontal movement, and said control signals may be configured to alter the angle of attack of one or both said wing members, dynamically depending on their relative location within a rotary cycle, or otherwise) to effect a selected horizontal movement of said vehicle. Furthermore, the vehicle may include a mechanism for changing the aerofoil cross-section of the blades of said propeller, relative to the direction of movement of said vehicle, according to the relative location of said blades within a rotary cycle of said propeller.

In accordance with another aspect of the present invention, there is provided an unmanned air vehicle substantially as described above.

In accordance with a further aspect of the present invention, there is provided a control module for a vehicle substantially as described above, the control module being configured to receive a control input and generate a control signal representative thereof configured to change the mode of flying of said air vehicle from said fixed wing mode to said rotary wing mode.

In accordance with yet another aspect of the present invention, there is provided a method of controlling an air vehicle comprising a main body and a pair of opposing wing members extending substantially laterally from the main body and affixed thereto, at least a first propulsion device associated a first of said wing members and a second propulsion device associated with a second of said wing members, each said propulsion device being arranged and configured to generate linear thrust relative to said main body, in use, the method comprising changing a mode of flying of said air vehicle from a fixed wing mode, in which the principal plane of the wing members is in a first orientation relative to the main body and the direction of thrust generated by the first and second propulsion devices relative to the main body is substantially the same, to a rotary wing mode, by maintaining said first orientation of the principal plane of the wing members relative to the main body and changing the direction of thrust generated by the first propulsion device such that it is opposite to that generated by the second propulsion device relative to the main body so as to create a rotational force that causes said main body to rotate.

These and other aspects of the present invention will be apparent from the following specific description, in which embodiments of the present invention are described, by way of examples only, and with reference to the accompanying drawings, in which:

Figure 2:
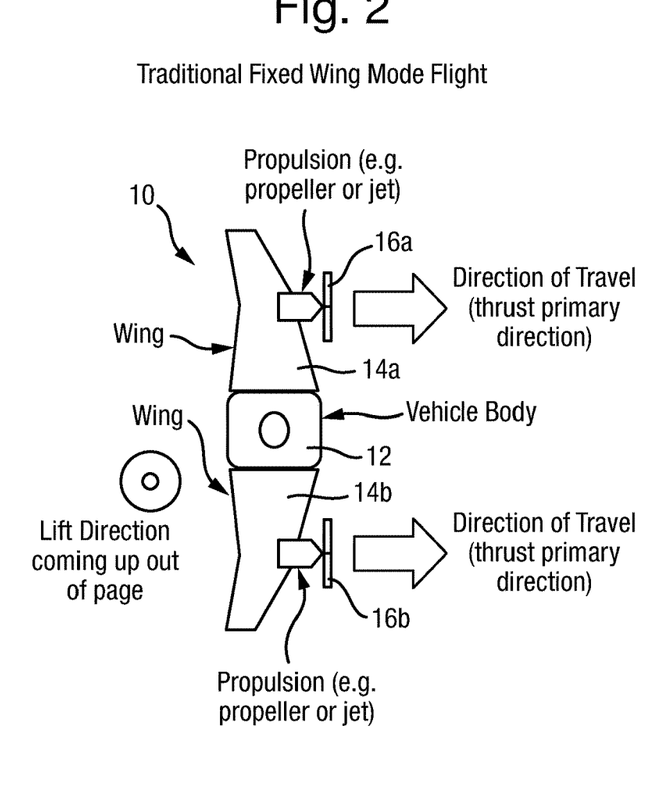
FIG. 2 is a schematic plan view of a hybrid fixed-rotary wing air vehicle according to a first exemplary embodiment of the present invention, illustrated in the fixed wing flying mode configuration.
Figure 3:
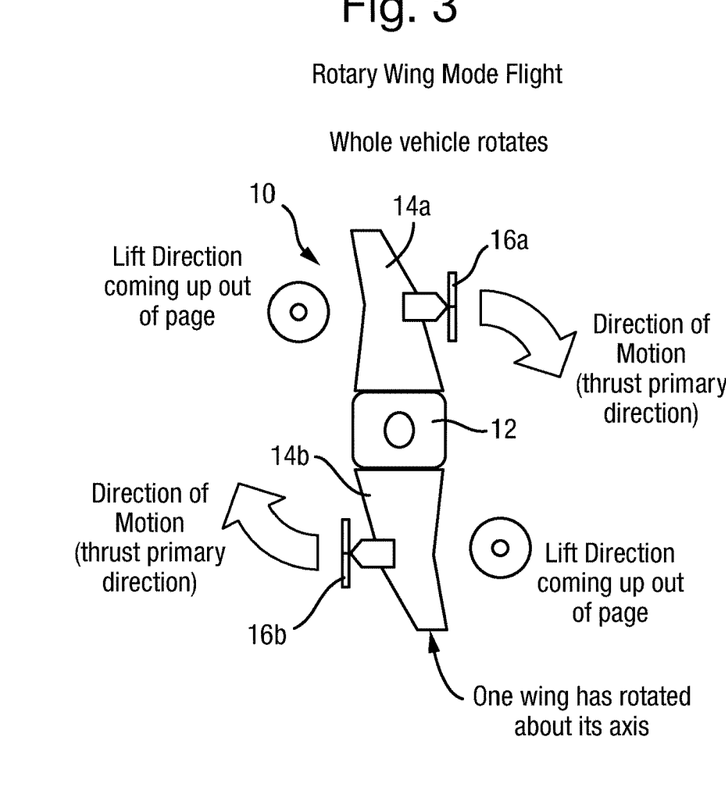
FIG. 3 is a schematic plan view of the hybrid fixed-rotary wing air vehicle of FIG. 2, illustrated in the rotary wing flying mode configuration.
Figure 3A:
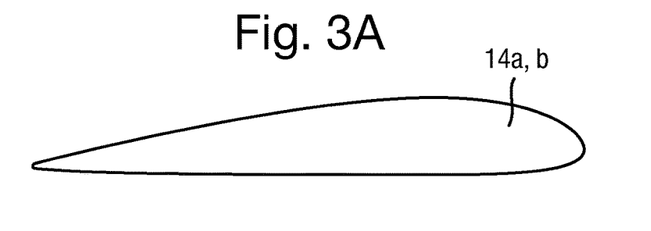
FIG. 3A is a schematic side cross-sectional view of a wing for use in a hybrid fixed-rotary wing air vehicle according to an exemplary embodiment of the present invention.

Referring to FIG. 2 of the drawings, an air vehicle 10 according to a first exemplary embodiment of the present invention comprises a main body 12, on which are mounted two opposing wing members 14a, 14b such that they extend laterally outward from respective opposing sides of the main body 12. In the example shown, the wings 14a, 14b have a compound swept back configuration, to aid aerodynamic stability and reduce drag, but it will be appreciated that the present invention is in no way intended to be limited with regard to wing configuration. A respective propulsion device 16a, 16b is mounted at the 'leading' edge of each wing 14a, 14b and, in the example shown, the propulsion devices 16a, 16b are facing in the same direction. Thus, when both propulsion devices are operated to generate thrust in the same direction, they cause the vehicle to move forwards. Referring additionally to FIG. 3A of the drawings, the aerofoil cross-sectional shape of the wings 14a, 14b produces an aerodynamic force as the vehicle moves forward; and the component of this force perpendicular to the direction of motion is called lift, whereas the component parallel to the direction of motion is called drag. "Turning" of the air in the vicinity of the aerofoil creates curved streamlines, resulting in lower pressure on one side and higher pressure on the other. This pressure difference is accompanied by a velocity difference, via Bernoulli's principle, so the resulting flowfield about the aerofoil has a higher average velocity on the upper surface than on the lower surface. The lift force is related directly to the average top/bottom velocity difference.

Figure 4:
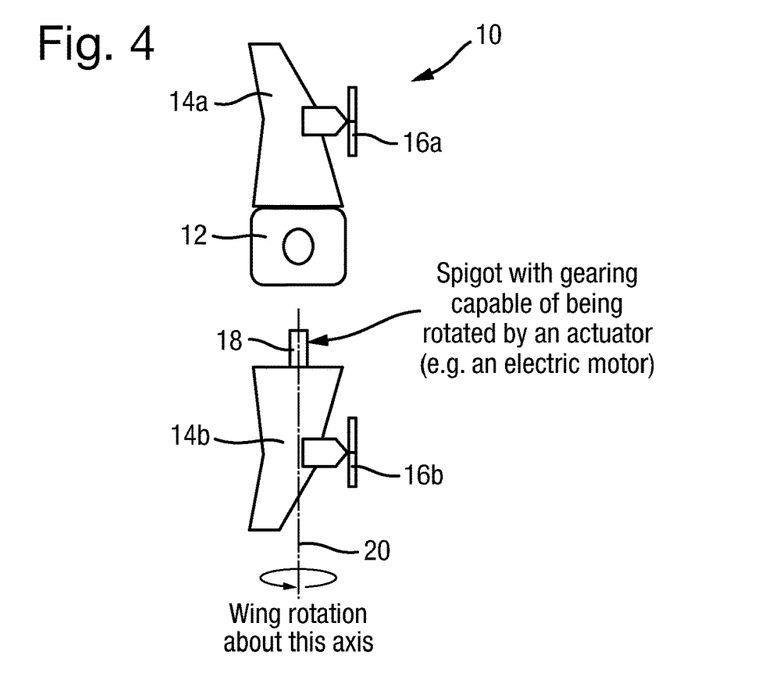
FIG. 4 is a schematic plan view illustrating the manner of connection of a wing to the main body in a hybrid fixed-rotary wing air vehicle according to an exemplary embodiment of the present invention.

Referring back to FIG. 2 and also to FIG. 4 of the drawings, at least one of the wings 14b is rotatably mounted on the side of the main body 12 by means of a longitudinal shaft 18 extending from the inner end of the wing 14b. Thus, referring to FIG. 3 of the drawings, in the event that it is required to change the mode of flying of the vehicle 10 from fixed wing to rotary wing flying mode, a control signal is generated that causes the wing 14b to rotate about the axis 20 defined by the shaft 18, such that the leading edge of the wing 14b and the associated propulsion device 16b are facing in the opposite direction. It can be seen that the principal plane of the wings 14a, 14b relative to the main body 12 remains substantially the same for the rotary wing mode of flying as it was for the fixed wing mode of flying. With the thrust from the two propulsion devices 16a, 16b now operating in opposite linear directions, the net result is a rotary force that causes the air vehicle 10 as a whole to spin about an axis substantially orthogonal to the direction of thrust. Lift is maintained because the spinning wings act a rotary blade forcing air downwardly to overcome the force of gravity and create vertical lift, and it can be seen that the orientation of the main body 12 itself remains substantially the same in both the fixed wing and rotary wing modes of flying (see also FIG. 4A of the drawings). However, it is envisaged that the effective aerofoil cross-section of the propeller blades may be dynamically altered according to their relative location within a rotary cycle in order to maintain efficient horizontal movement of the vehicle. In the rotary wing mode, the aircraft can be controlled in a manner similar to a conventional rotary wing air vehicle, to control vertical, horizontal and rotational movement of the vehicle, as required.

Figure 4A:
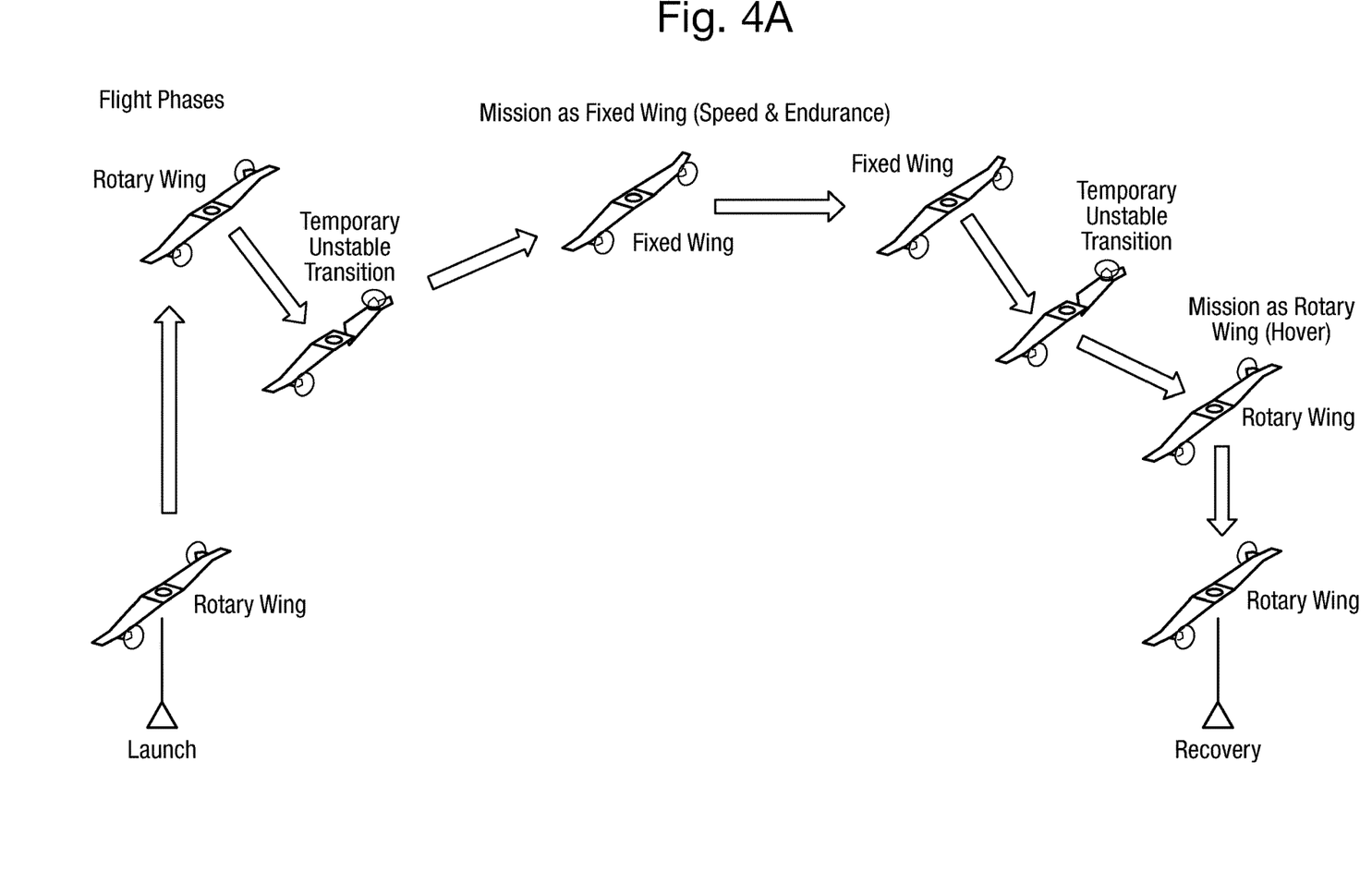
FIG. 4A is a schematic diagram illustrating the flight phases of a typical mission undertaken by a hybrid fixed-rotary wing air vehicle according to an exemplary embodiment of the present invention.

Thus, referring to FIG. 4A of the drawings, the present invention provides an air vehicle concept which is capable of hovering flight, taking off and landing vertically within landing zones similar to, or smaller than, those associated with typical rotary wing aircraft, but has the ability to transition to fixed wing flight, thereby achieving the increased speed and endurance characteristics associated therewith.

Figure 5:
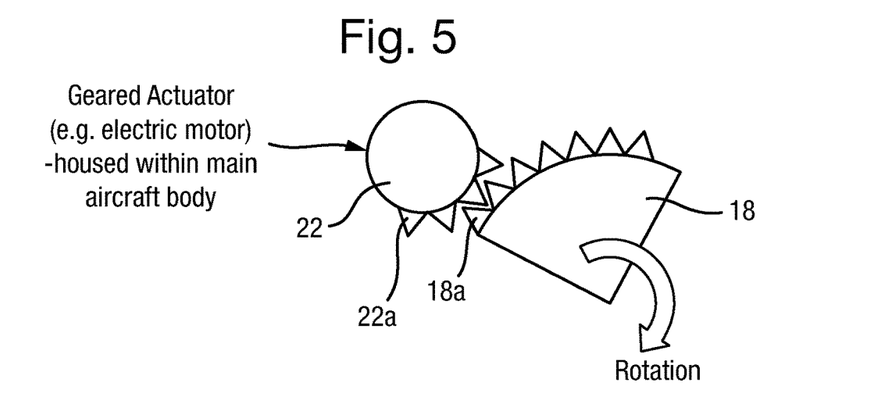
FIG. 5 is a schematic representation of a mechanism for causing rotation of a wing in a hybrid fixed-rotary wing air vehicle according to an exemplary embodiment of the present invention.

There are a number of different ways in which rotation of the wing 14b could be achieved, as will be apparent to a person skilled in the art. In one exemplary embodiment, and referring additionally to FIG. 5 of the drawings, the end of the shaft 18, which may comprise a geared spigot, may be coupled to a geared actuator 22 (e.g. electric motor) housed within the main body 12, such that when the actuator 22 (e.g. the main shaft of an electric motor) is rotated, a set of teeth 22a on its outer periphery engage with a corresponding set of circumferential teeth 18a on the spigot/shaft 18 causing corresponding rotary movement of the shaft 18 and, therefore, the wing 14b coupled thereto.

Figure 6A:
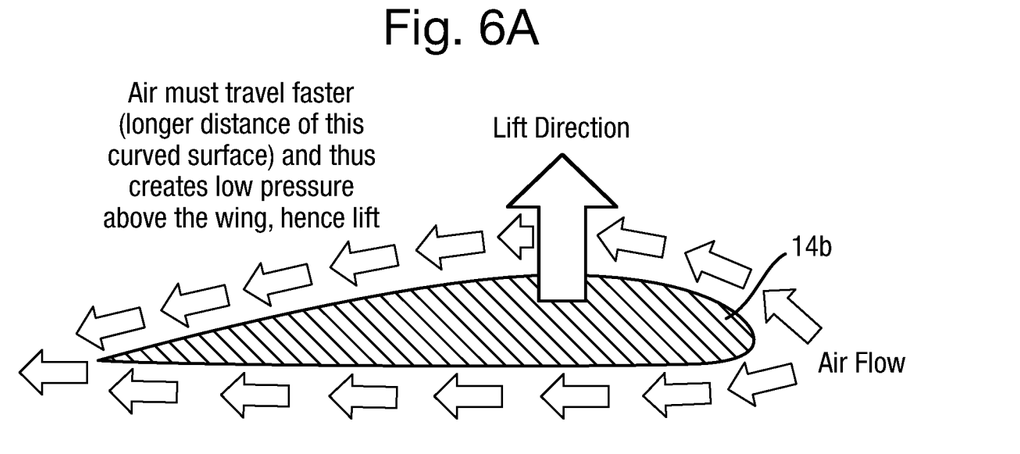
FIGS. 6A and 6B are schematic side cross-sectional views of a wing in respective upright and inverted orientations.
Figure 6B:
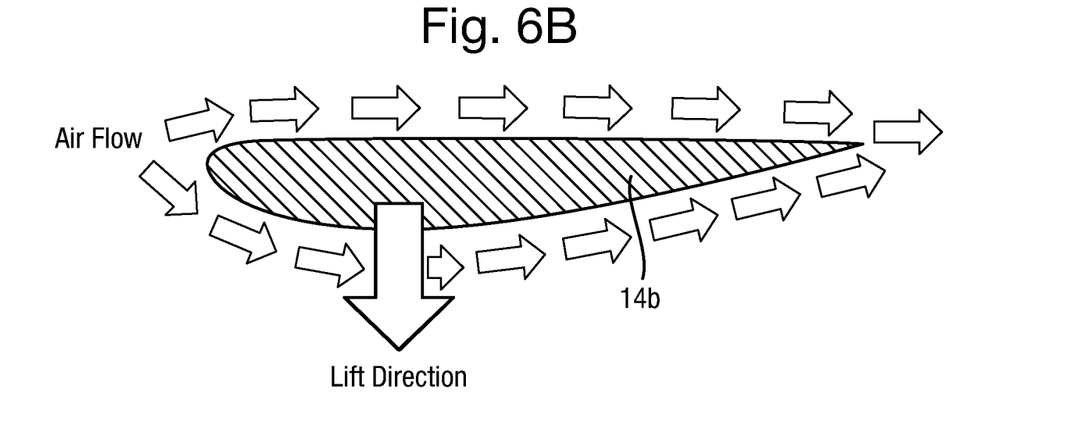

It will be appreciated, however, depending on the cross-sectional shape of the rotated wing 14b, there may be an issue caused by the inversion of the aerofoil, which in turn will have a counter-productive effect on the lift component of the aerodynamic force created as the wing moves through the air, depending on where the wing is within a complete rotary cycle of the vehicle. This is illustrated schematically in FIGS. 6A and 6B of the drawings. Thus, as shown in FIG. 6A, a typical aerofoil cross-section will create a higher pressure across the bottom of the wing 14b, thus creating upward lift. Whereas, as shown in FIG. 6B of the drawings, when the wing 14b has been rotated through 180° and the aerofoil has thus been inverted, the higher pressure area occurs at the upper surface of the wing 14b, thus creating a downward 'lift', which may cause the air vehicle to tumble out of control and/or otherwise descend.

Figure 6C:
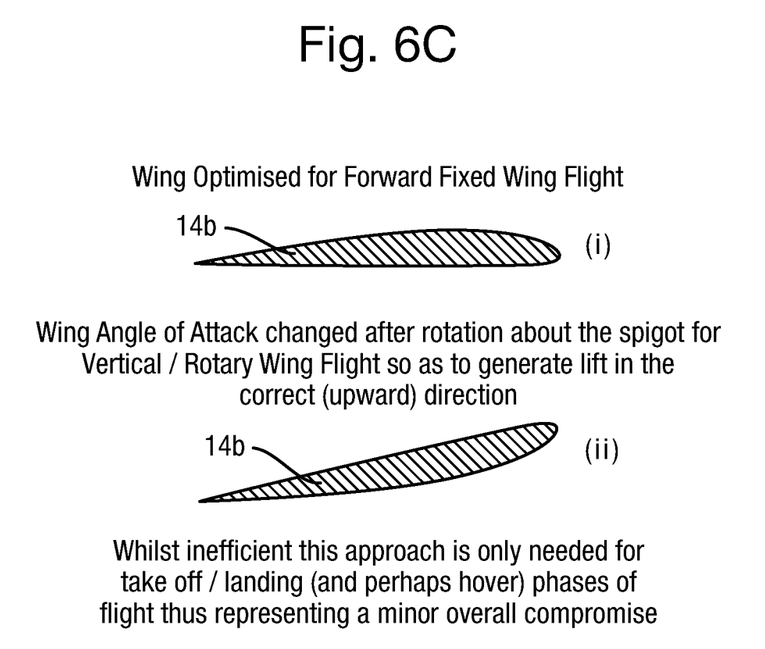
FIG. 6C is a schematic diagram illustrating the concept of changing the angle of attack of a wing after it has been rotated to reverse the thrust direction, so as to compensate for the resultant counter-productive lift created by an inverted aerofoil.

It is envisaged that this issue could be addressed by effecting an altered angle of attack in respect of the rotated wing, cyclically or otherwise, when in the rotary wing mode, possibly depending on where the wing is within the rotary cycle. Thus, referring to 6C of the drawings, in (i), the wing aerofoil, optimised for fixed wing flight is illustrated schematically, whereas in (ii), it can be seen that the angle of attack of the wing 14b may be changed for the rotary wing flight mode so as to generate lift in the upward direction. As shown, in the rotary wing mode, the wing 14b has not only been rotated 180° about its central longitudinal axis to reverse the direction of the propulsion device 16b, but it has also been rotated downward, about an orthogonal axis (parallel to the thrust direction). This additional rotation could also be achieved via the spigot 18 engaged with the actuator. Furthermore, it is envisaged that the orientation of the aerofoil cross-section of the propeller blades (relative to the direction of motion of the vehicle) may be alternately, cyclically or dynamically changed as it completes each rotary cycle, to prevent a counter-productive effect on horizontal movement of the vehicle.

Figure 7A:
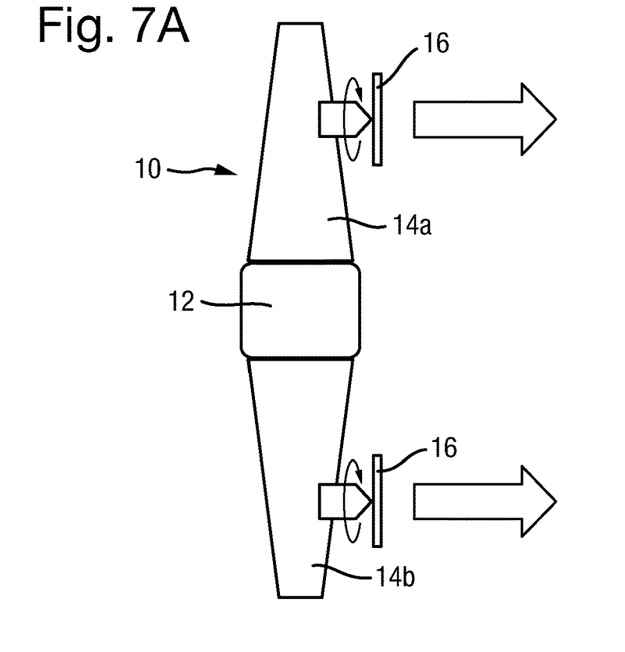
FIGS. 7A and 7B are schematic plan views of a hybrid fixed-rotary wing air vehicle according to a second exemplary embodiment of the present invention, in the fixed wing and rotary wing flying modes, respectively.
Figure 7B:
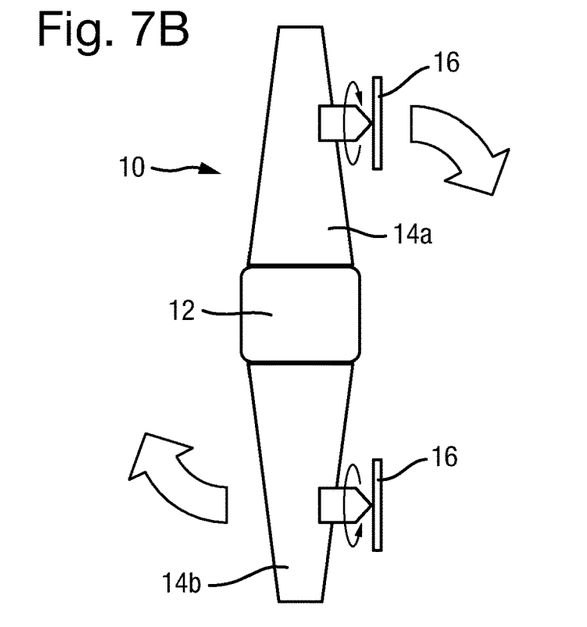

Referring to FIGS. 7A and 7B of the drawings, therefore, in an alternative exemplary embodiment, rather than rotating the wing 14b through 180° to create the reversal of thrust direction in respect of one of the propulsion devices 16, it is envisaged that the direction of rotation of the propulsion device 16 could instead be reversed. As shown in FIG. 7A, in the fixed wing mode, the propulsion devices 16 are both rotating or otherwise operating such that the thrust generated thereby is in the same direction relative to the vehicle body 12, as in the previous exemplary embodiment. However, in this case, and referring to FIG. 6B of the drawings, in the rotary wing mode, the wings 14a and 14b remain fixed and the location of the respective propulsion devices 16 also remains fixed. Instead, in response to a control signal, the direction of rotation of one of the propulsion devices 16 is reversed, such that the thrust direction is reversed to have the effect of 'pushing' the associated wing 14b in a direction opposite to the 'pull' being created on the opposing wing 14a, as illustrated schematically in FIG. 7B of the drawings. This causes the entire vehicle, including the wings 14a, 14b and body 12, to spin.

Helicopters and similar rotary wing air vehicles employ a swashplate to translate input via helicopter flight controls into motion of the rotor blades. The swash plate assembly has two primary roles: under the direction of a collective control, it can change the angle of both blades simultaneously. Doing this increases or decreases the lift supplied to the vehicle, allowing it to gain or lose altitude; under the direction of cyclic control, on the other hand, the swash plate assembly can change the angle of the blades individually as they revolve, allowing the vehicle to move in any direction around a 360° circle, including forward, backward, left and right. In summary, the collective control changes the angle of attack on both blades simultaneously, to ascend or descend, whereas the cyclic control tilts the swashplate assembly so that the angle of attack on one side of the vehicle is greater than on the other.

In the present invention, wherein the entire vehicle is spinning in the rotary wing mode, provision can be made to enable similar (automatic or remote) control of the air vehicle during a flight. In a conventional rotary wing vehicle, the speed of rotation of the rotary wing is substantially constant throughout, whereas in accordance with exemplary embodiments of the present invention, the control module may be configured to generate control signals (in response to control inputs) to increase the speed of rotation of the propulsion devices 16 (and, therefore, the entire vehicle) in order to cause the vehicle to gain altitude and, conversely, decrease the speed of rotation of the vehicle in order to cause the vehicle to lose altitude. The cyclic control required to effect horizontal movement may be achieved in a number of different ways. In a first exemplary embodiment, adjustable slats or flaps may be provided on the wings 14a, 14b to enable small asymmetries to be selectively created in respect of the wing cross section(s). In an alternative exemplary embodiment, the wings 14a, 14b may be adjustably mounted on the body 10 and means may be provided for selectively adjusting the angle of attack of one or both wings so as to introduce a differential therebetween.

It will be appreciated by a person skilled in the art, from the foregoing description, that modifications and variations can be made to the described embodiments, without departing from the scope of the invention as defined in the appended claims.

The invention claimed is:

1. An air vehicle comprising:
a main body;
a pair of opposing wing members extending substantially laterally from the main body comprising a first wing member and a second wing member,
a first propulsion device associated with said first wing member;
a second propulsion device associated with said second wing member, wherein each said propulsion device is arranged and configured to generate linear thrust relative to said main body, in use;
wherein said propulsion devices comprise propellers,
a control module for generating a control signal configured to change a mode of flying of said air vehicle, in use, between a fixed wing mode and a rotary wing mode, wherein:
in said fixed wing mode of flying, said first propulsion device generates a first thrust and said second propulsion device generates a second thrust wherein there exists a primary direction of thrust relative to the main body, and wherein said first thrust and said second thrust are substantially equal and in a first direction, and
in said rotary wing mode of flying, a secondary orientation of a principal plane of said wing members relative to said main body is substantially the same as that in the fixed wing mode of flying, and the direction of thrust generated by the first propulsion device relative to the main body is in the first direction and the direction of thrust generated by said second propulsion device relative to said main body is in a second direction, wherein said second direction is substantially opposite to said first direction, so as to create a rotational force;
said wing members being fixedly coupled to said main body in said rotary wing mode of flying such that said main body is caused to rotate by said rotational force; and
said change of mode of flying is effected by changing the direction of rotation of one of said propellers.

2. The air vehicle according to claim 1, wherein:
the air vehicle is an unmanned air vehicle.

3. The air vehicle according to claim 1, wherein:
the control module is configured to receive a control input and generate a control signal representative thereof configured to change the mode of flying of said air vehicle from said fixed wing mode to said rotary wing mode.

4. The air vehicle according to claim 1, wherein:
said control module is configured to receive control inputs representative of vehicle movement and generate control signals configured to cause the respective vehicle movement.

5. The air vehicle according to claim 1, wherein said control module is configured to receive control inputs representative of vehicle movement and generate control signals configured to cause the respective vehicle movement.

6. The air vehicle according to claim 1, wherein:
the air vehicle is an unmanned air vehicle.

7. A control module for a vehicle according to claim 1, wherein:
the control module is configured to receive a control input and generate a control signal representative thereof configured to change the mode of flying of said air vehicle from said fixed wing mode to said rotary wing mode.

8. The air vehicle according to claim 1, wherein:
said propulsion devices are fixedly coupled to respective wing members, and
at least one of said wing members is rotatably mounted with respect to said main body for rotation about an axis orthogonal to the width of the main body when in an upright orientation, between a first position which defines said fixed flying mode wherein said first thrust acts in the same direction as said second thrust relative to the main body, and a second position which defines said rotary wing flying mode wherein said first thrust acts in an opposite respective direction of said second thrust relative to said main body.

9. The air vehicle according to claim 8, wherein:
said at least one wing member is configured to rotate through substantially 180° about said axis between said first and second positions.

10. The air vehicle according to claim 8, wherein:
the at least one wing member is mounted to the main body via a coupling member, said coupling member engaging with an actuation device located in or on said main body, wherein operation of said actuation device is effected by said control signal and causes rotation of said at least one wing member via said coupling member.

11. The air vehicle according to claim 10, wherein:
said at least one wing member is mounted to said main body via a geared spigot, the air vehicle further comprising:
a geared actuator assembly with which said geared spigot engages, in use, wherein rotation of said actuator causes corresponding rotation of said at least one wing member, via said geared spigot, between said first position and said second position.

12. The air vehicle according to claim 1, wherein:
said control module is configured to receive control inputs representative of vehicle movement and generate control signals configured to cause the respective vehicle movement.

13. The air vehicle according to claim 12, wherein:
said vehicle movement comprises an increase or decrease in altitude, and
said control signals are configured to cause a respective substantially equal increase or decrease in thrust generated by both of said propulsion devices.

14. The air vehicle according to claim 12, wherein:
said vehicle movement comprises a horizontal movement in a selected direction,
said wing members comprise selectively movable flight control members, and
said control signals are configured to effect cyclic control of said air vehicle by selectively changing the cross-sectional shape of the respective wing members by selective movement of said flight control members.

15. The air vehicle according to claim 12, wherein:
said vehicle movement comprises a horizontal movement, and
said control signals are configured to alter the angle of attack of one or both said wing members to effect a selected horizontal movement of said vehicle.

16. The air vehicle according to claim 12, wherein:
at least one of said propulsion devices includes blades, and
wherein said air vehicle includes a mechanism for changing the aerofoil cross-section of the blades of at least one of said propulsion devices, relative to the direction of movement of said vehicle, according to the relative location of said blades within a rotary cycle of said propeller.

17. A method of controlling an air vehicle comprising:
a main body and
a pair of opposing wing members extending substantially laterally from the main body and affixed thereto,
at least a first propulsion device associated a first of said wing members, and
a second propulsion device is arranged and configured to generate linear thrust relative to said main body by rotation of propellers, in use,
the method comprising:
changing a mode of flying of said air vehicle from a fixed wing mode, in which the principal plane of the wing members is in a first orientation relative to the main body and the direction of thrust generated by he firs and second propulsion devices relative to the main body is substantially the same, to a rotary wing mode, by
maintaining said first orientation of the principal plane of the wing members relative to the main body and
changing the direction of thrust generated by the first propulsion device by changing the direction of rotation of the propeller such that it is opposite to that generated by the second propulsion device relative to the main body so as to create a rotation force that causes said main body to rotate.

18. An air vehicle comprising:
a main body and
a pair of opposing wing members extending substantially laterally from the main body,
at least a first propeller associated with a first of said wing members and
a second propeller associated with a second of said wing members,
wherein each said is arranged and configured to generate linear thrust relative to said main body, in use,
a control module for generating a control signal configured to change a mode of flying of said air vehicle, in use, between a fixed wing mode and a rotary wing mode, wherein:
in said fixed wing mode of flying, the direction of thrust generated by the first and second propellers relative to said main body is substantially the same, and
in said rotary wing mode of flying, the direction of thrust generated by said first propeller is opposite to that generated by the second propeller,
wherein said change of mode of flying is effected by changing the direction of rotation of one of said propellers.

* * * * *

UNITED STATES PATENT AND TRADEMARK OFFICE
CERTIFICATE OF CORRECTION

PATENT NO. : 10,814,972 B2
APPLICATION NO. : 15/767041
DATED : October 27, 2020
INVENTOR(S) : Julian David Wright, Nicholas Giacomo Robert Colosimo and Clyde Warsop It is certified that error appears in the above-identified patent and that said Letters Patent is hereby corrected as shown below:

In the Claims

Column 8, Line 31 reads "The air vehicle according to claim 1" and should read "The vehicle according to claim 1"

Column 10, Line 11 reads "a second propulsion device is arranged and configured" and should read "a second propulsion device associated with a second of said wing members, wherein each said propulsion device is arranged and configured"

Column 10, Line 12 reads "generate linear thrust relative to said main body by rotation of propellers, in use" and should read "generate linear thrust relative to said main body, in use"

Column 10, Line 18 reads "body and the direction of thrust generated by he firs and" and should read "body and the direction of thrust generated by the first and"

Column 10, Line 24 reads "propulsion device relative to the main body so as to create a rotation force" and should read "propulsion device relative to the main body so as to create a rotational force"

Column 10, Line 37 reads "wherein each said is arranged and configured" and should read "wherein each said propeller is arranged and configured"

Signed and Sealed this
First Day of October, 2024

Katherine Kelly Vidal
*Director of the United States Patent and Trademark Office*